May 31, 1960  O. L. ANDERSON ET AL  2,938,386
METHOD AND APPARATUS FOR MEASURING PREDETERMINED PRESSURES
Filed April 8, 1957  4 Sheets-Sheet 1
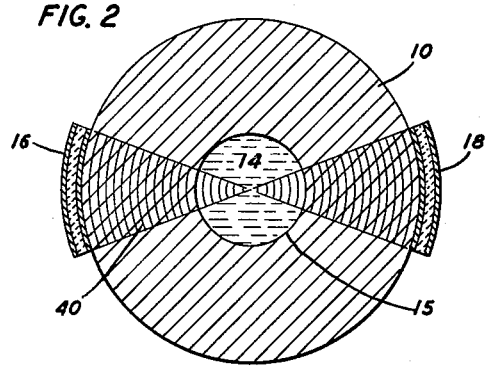
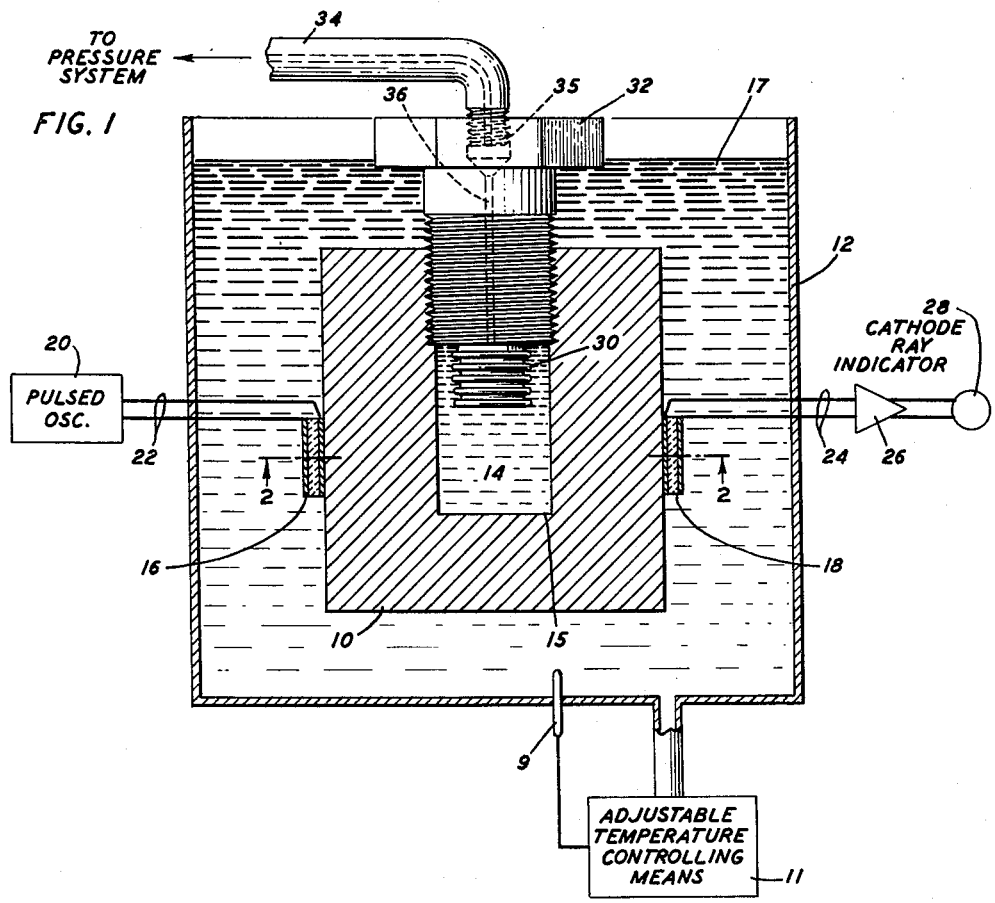
INVENTORS O. L. ANDERSON
P. ANDREATCH, JR.
H. J. McSKIMIN
BY H. O. Wright
ATTORNEY

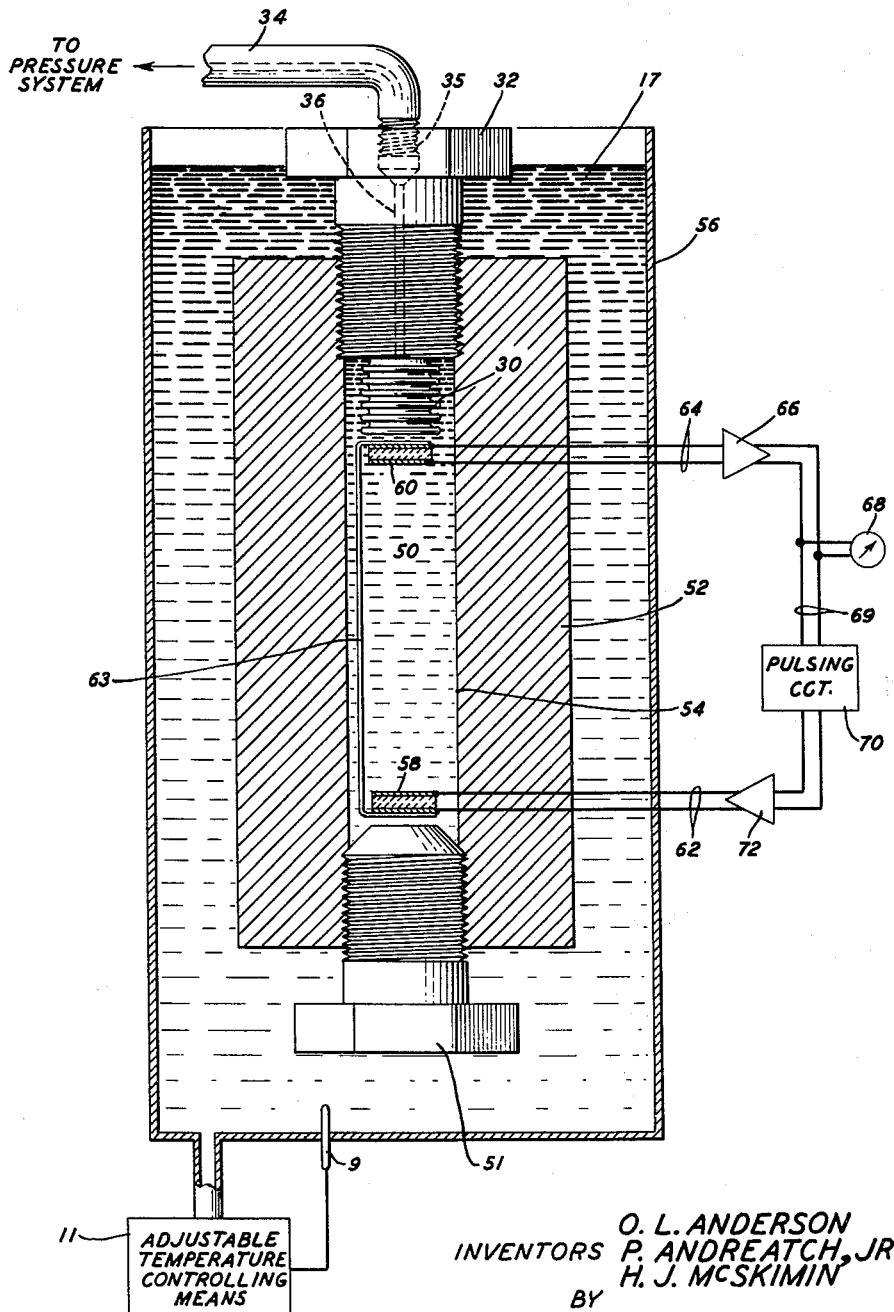

May 31, 1960 O. L. ANDERSON ET AL 2,938,386
METHOD AND APPARATUS FOR MEASURING PREDETERMINED PRESSURES
Filed April 8, 1957 4 Sheets-Sheet 3

INVENTORS O. L. ANDERSON
P. ANDREATCH, JR.
H. J. McSKIMIN
BY
H. O. Wright
ATTORNEY

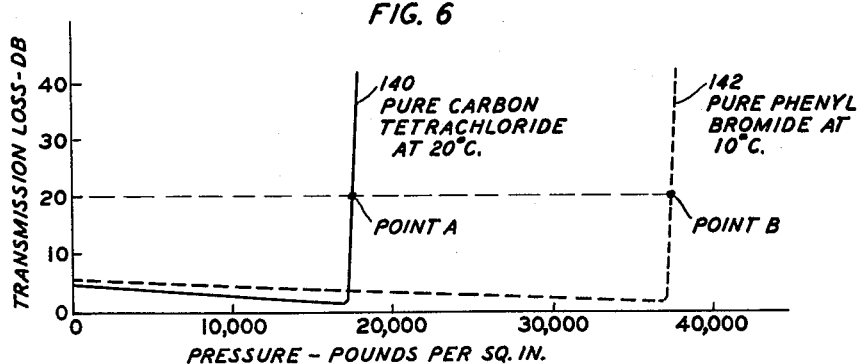
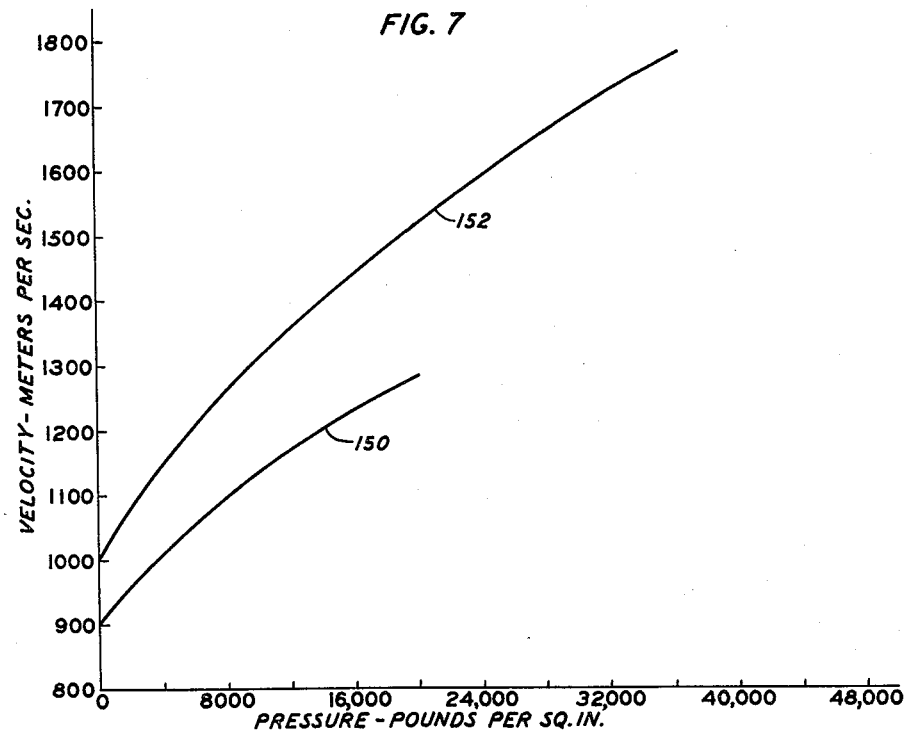
INVENTORS
O. L. ANDERSON
P. ANDREATCH, JR.
H. J. McSKIMIN
BY
H. O. Wright
ATTORNEY

United States Patent Office 2,938,386
Patented May 31, 1960

2,938,386

METHOD AND APPARATUS FOR MEASURING PREDETERMINED PRESSURES

Orson L. Anderson, Summit, Peter Andreatch, Jr., South Plainfield, and Herbert J. McSkimin, Basking Ridge, N.J., assignors to Bell Telephone Laboratories, Incorporated, New York, N.Y., a corporation of New York Filed Apr. 8, 1957, Ser. No. 651,528

2 Claims. (Cl. 73—398)

This invention relates to laboratory pressure substandards and gauges. More particularly, it relates to pressure substandards and gauges in which the ultrasonic characteristics of a specific liquid at a specific temperature are employed to obtain an accurate indication of the pressure in a pressure testing system.

The principal object of the invention is to facilitate the precise determination of specific pressures in pressure testing systems.

Another object is to provide more convenient and precise pressure indicating devices for use in pressure laboratories.

During recent years there has been a marked increase in the amount and intensity of research work directed toward the determination of the effect of pressure, or various combinations of pressure and temperature, upon the behavior of materials.

Since virtually all conveniently usable forms of prior art pressure gauges or pressure cells employing piezoresistive wires, or other commonly used types of pressure indicators, are frequently in need of recalibration or checking, there is a very real need for laboratory pressure substandards and gauges which can afford dependable accurate pressure readings with a minimum of effort.

Since the freezing points of certain specific liquids such as mercury, pure carbon tetrachloride, and the like, when substantially of chemical purity, are definitely fixed as functions of temperature and pressure, they have been employed for some years as laboratory substandards as discussed in detail, for example, by D. P. Johnson and D. H. Newhall in the Transactions of the American Society of Mechanical Engineers, volume 75, No. 3, for April 1953, in an article starting at page 301 and entitled, "The Piston Gauge as a Precise Pressure Measuring Instrument."

However, in the above specific arrangement and all prior art arrangements of which applicant is aware, it is necessary to accurately determine a considerable number of elusive parameters, such as the volume of the entire pressure system and the individual volume of the component parts of the system corrected for elastic deformations resulting from high pressure, as well as the temperatures of all its parts, to check for any possible leakage at any point in the whole system and to perform a number of more or less complicated tests or calculations or both before an accurate check on the absolute pressure under any particular set of circumstances can be obtained.

Accordingly, as previously noted, it is the primary object of the present invention to facilitate the accurate straightforward determination of specific pressures in pressure testing systems by methods and apparatus which are extremely simple and easy to use. Furthermore, the methods and apparatus of the invention are to a high degree independent of the numerous possible vagaries, elastic deformations under high pressures and temperatures, and defects of the overall pressure testing systems which have rendered the use of prior art pressure substandards and gauges difficult to use and at times of uncertain value. In particular it is most convenient that the arrangements of the invention are independent of the uncertainty involved in the determination of the absolute volume of each of the components of the pressure system.

The present invention, in one aspect, is based upon the concept that the freezing point of a liquid, such as chemically pure carbon tetrachloride, can be accurately detected by transmitting ultrasonic energy through the liquid and measuring the energy transmitted. At the inception of solidification the transmission loss will rise sharply to a very high value and consequently the transmitted energy will be rapidly reduced to a negligible amount.

It is important that the specific liquid employed be of a high degree of purity since the presence of any appreciable quantity of impurities will usually result in a much less sharply defined freezing "point." Stated in other words, the transition from the liquid to the solid state will, in the presence of appreciable impurities, ordinarily not be susceptible to nearly so precise determination as for the pure liquid.

It is also, of course, necessary, insofar as it is practicable to do so, to maintain the temperature of the liquid at an accurately known value so that the pressure at which solidification takes place can be more accurately determined. Because of the "time lag" in the freezing and/or melting processes, frequently aggravated by the fact that the liquid can become supercooled, where extreme precision is desired it may be necessary to interpolate between the boundary condition of the specific liquid having just become completely frozen and the boundary condition of the specific liquid having just become completely melted to arrive at a more precise determination of the freezing point. This matter is of course well known and understood by those skilled in the art. A more direct approach of very nearly as high precision is afforded by use of the principles of the present invention as described in detail hereinunder.

One form of an arrangement for use in practicing the invention can, accordingly, comprise a small pressure chamber, preferably of steel, having a relatively small cavity filled with a specific liquid such, for example, as pure carbon tetrachloride. An ultrasonic electromechanical transducer, such as, for example, a barium titanate ceramic transducer, is mounted on each side of the chamber, the two transducers being at diametrically opposite positions so that ultrasonic energy impulses generated by one transducer will pass through the immediately adjacent chamber wall, thence through the liquid enclosed within the chamber and through the opposite chamber wall to the other transducer. An electrical indicator, for example a cathode ray oscilloscope, connected to the other, or receiving, transducer may, for example, indicate the amplitude of ultrasonic energy impulses arriving at the second, or receiving, transducer.

Pressure from the overall system to be calibrated is impressed by way of appropriate piping upon the specific liquid within the chamber through, for example, a flexible metallic bellows which freely transmits the pressure but prevents adulteration of the specific liquid by the pressure medium, the latter usually being kerosene or other refined mineral oil.

The small chamber containing the specific liquid and its immediate appurtenances as described above, are mounted within an enclosure. The temperature within the enclosure is accurately controlled and, preferably, can be accurately adjusted over a wide range of temperatures so that a corresponding wide range of pressures can be checked. By way of example, the enclosure may contain a liquid bath in which the small pressure chamber is immersed. Means for heating or cooling the liquid subject to thermostatic control completes the temperature control apparatus. A number of suitable arrangements of this type have, of course, long been known and extensively employed by those skilled in the art. When a substantial change in pressure or temperature is made, a sufficient interval, for example, in the order of twenty to thirty minutes, should be allowed to elapse before making further measurements to insure that the chamber, its contents and appurtenances have all had time to become readjusted to the correct temperature.

The small pressure chamber containing a particular specific liquid is arranged so that it can readily be detached from the pressure system and an identical chamber containing a different specific liquid substituted in its place. In a more complex arrangement, a plurality of chambers each enclosing a different specific liquid may be simultaneously connected to the pressure system so that a plurality of pressures may be accurately determined in succession as the pressure of the system successively reaches the pressures corresponding to the respective freezing points of the different liquids.

It is therefore apparent that by the combined use of appropriate temperature adjustments with a relatively small number of chambers, each containing a different specific liquid, a very appreciable number of pressures can be accurately checked and these may be distributed over a very wide range of pressures.

By way of example, chemically pure carbon tetrachloride solidifies at approximately −22.9 degrees centigrade at atmospheric pressure (approximately fifteen pounds per square inch) and follows an approximately straight line variation "pressure versus temperature" curve, so that at +20 degrees centigrade the pure carbon tetrachloride solidifies at substantially 17,200 pounds per square inch pressure. The temperature versus pressure characteristics for the freezing point of pure carbon tetrachloride and a number of other liquids will be discussed more fully hereinunder.

In another specific arrangement of the invention, which employs a somewhat larger pressure chamber than the above described specific arrangement and, as will immediately be apparent, is a gauge having an appreciable range over which it will afford pressure indications, the velocity of the ultrasonic waves is measured through a specific liquid held at a known controlled temperature and subject to the pressure of the system. Since the velocity is a function of the pressure, the observed velocity at any instant constitutes an indication of the pressure of the system. In such a system, also, the sudden disruption of transmission through the liquid will indicate that the freezing point pressure has been reached, substantially as described above for the small pressure chambers, though a more precise determination of this phenomenon can ordinarily be obtained with the smaller chamber. This is so since, as is well known to those skilled in the art, the larger the quantity of liquid the more difficult it is to make certain that all parts of the liquid are actually at exactly the same temperature. Should there be any temperature variation throughout the liquid, it may solidify progressively making it more difficult to determine the precise instant at which the required pressure has been established.

Other objects, features and advantages of the invention will become apparent during the course of the following detailed description of specific illustrative embodiments of the invention and from the appended claims.

In the accompanying drawings:

Fig. 1 illustrates, in diagrammatic side elevation, one arrangement for checking pressure in accordance with certain principles of the invention;

Fig. 2 illustrates, in a partial cross-sectional view, a portion of the arrangement of Fig. 1;

Fig. 3 illustrates, in diagrammatic side elevation, a second arrangement for checking and indicating pressure in accordance with other principles of the invention;

Fig. 6 illustrates ultrasonic transmission versus pressure characteristics of a number of specific liquids at specified temperatures; and Fig. 7 illustrates the ultrasonic velocity versus pressure characteristics of a number of specific liquids.

Figure 4:
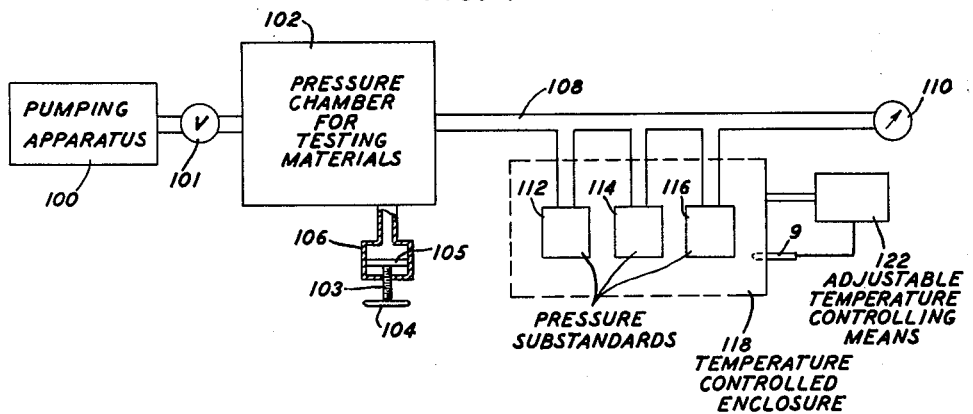
Fig. 4 illustrates, in diagrammatic form, an overall pressure testing system with a plurality of pressure checking or indicating devices attached thereto.
Figure 5:
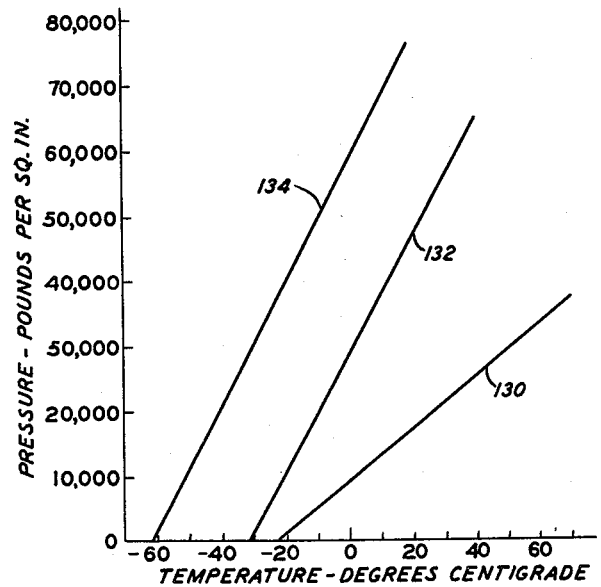
Fig. 5 illustrates typical freezing point pressure versus temperature variation characteristics of a number of specific liquids.

In more detail, in Fig. 1 the small steel cylinder 10 includes a recess or cavity 15 centrally positioned within it. The upper end of cavity 15 is threaded to receive a threaded plug 32. A metal bellows 30 is mounted on the lower end of plug 32 and is connected through a passage 36 to a threaded hole 35 at the top of plug 32. A pipe 34 has its end threaded to fit hole 35 and serves to make connection with the overall pressure system, the pressure of which is to be checked. One illustrative diagrammatic representation of an overall pressure testing system will be described subsequently in connection with Fig. 4.

A specific testing liquid 14 such as, for example, chemically pure carbon tetrachloride is placed within the recess or cavity 15. The quantity of liquid 14 should be sufficient to completely fill the space remaining after plug 32, carrying bellows 30, is firmly installed in cylinder 10, the upper end of hole 35 being open to the atmosphere. A pair of electroacoustic transducers 16 and 18 are fitted to and mounted on the outer surface of cylinder 10 at diametrically opposite positions, as shown, the upper surfaces of the transducers being below the lower end of bellows 30 and the lower surfaces of the transducers being above the lower end of cavity 15. Transducers 16 and 18 can preferably be of barium titanate ceramic arranged to transmit and receive compressional acoustic waves.

A high frequency stabilized pulsed oscillator 20, having a frequency, for example, of ten megacycles, is connected by leads 22 to the input transducer 16 as shown. The output transducer 18 is connected by leads 24 to an amplifier-detector 26, the detector output being connected to the vertical deflecting plates of a cathode ray oscilloscope indicator 28, the horizontal sweep of the oscilloscope being synchronized with the pulsing rate of oscillator 20. With such an arrangement the directly transmitted pulses can be readily distinguished from any spurious or unwanted pulses which may arise as a result of reflection at interfaces of the steel and liquid and the like, since the directly transmitted pulses will be of appreciably greater amplitude.

Cylinder 10 is surrounded by an enclosure 12 as indicated, the enclosure being, for example, filled with mineral oil 17. The temperature of oil 17 is maintained at any predetermined temperature desired within a wide range by the action of adjustable temperature controlling means 11 guided by thermostat 9. Numerous forms of such arrangements, and many alternative temperature controlling arrangements, are well known and extensively used by those skilled in the art. Accordingly, no detailed discussion of such arrangements is deemed necessary here.

In operation, pipe 34 is tightly connected to plug 32, the pipe, passage 36, and the inside of bellows 30 being filled with the pressure transmitting medium, which may, for example, be kerosene or the like, used in the pressure system, the pressure of which is to be checked. The other end is connected to the main body of pressure fluid of the pressure system so that the pressure of the system is transmitted through bellows 30 to the specific liquid 14 within the lower end of cavity 15. Bellows 30 should be highly flexible and of minimum practicable stiffens. The calibration of the apparatus will of course include allowance for the stiffness of the bellows.

The temperature of the oil bath 17 is adjusted to a predetermined value such as, for example, twenty degrees centigrade and sufficient time (normally about twenty minutes) is allowed for cylinder 10 and the enclosed specific fluid 14 to reach this temperature. The temperature is accurately maintained by the combined action of means 11 and thermostat 9 in accordance with practices well known and widely practiced in the art.

In Fig. 2 a transverse sectional view of cylinder 10 and transducers 16, 18, through plane A—A of Fig. 1 is illustrated. The transducers are curved to conform to the curvature of cylinder 10. Transducer 16 preferably transmits regularly recurring pulses of compressional ultrasonic waves 40 through the adjacent wall of cylinder 10, and as a result of its curvature causes them to converge upon the longitudinal axis of cavity 15, containing liquid 14, from which position they diverge, pass through the opposite wall of cylinder 10 and strike transducer 18. The specific arrangement illustrated is particularly advantageous in view of the fact that the wave fronts of the ultrasonic waves are parallel to the interfaces between liquid 14 and cylinder 10 and a minimum scattering of energy reflected by these interfaces will therefore be encountered.

As suggested above, a relatively high frequency such as ten megacycles is preferable, since the larger the transducers as compared with the wavelength of the energy, the sharper will be the directive effect of the curved transducers. The arrangement also permits the use of a relatively small amount of specific liquid 14 and thereby reduces any time lag such as might result from the necessity of bringing all parts of a larger sample to a specific temperature before an accurate calibration at that temperature could be obtained.

It should, however, be clearly understood that the arrangement illustrated in Fig. 1 is but one specific embodiment. Numerous and varied other arrangements employing the principles illustrated by this specific embodiment can readily be devised by those skilled in the art without departing from the spirit and scope of the principles of the present invention.

The curve 140 of Fig. 6 illustrates the relation of the amplitude of transmission through the liquid 14, assumed to be pure carbon tetrachloride, for various pressures, the temperature of the liquid being maintained at substantially twenty degrees centigrade. When the pressure increases to 17,200 pounds per square inch or greater, the liquid begins to solidfy or freeze and the transmission loss through it begins to increase sharply. This means that the amplitude of the energy pulses reaching the output transducer 18 of Figs. 1 and 2 will be reduced sharply with a corresponding decrease in these pulses as displayed on indicator 28. Curve 142 of Fig. 6 illustrates the transmission versus pressure for a specific liquid 14 comprising pure phenyl bromide at a temperature of ten degrees centigrade. As mentioned above, each measurement of loss versus pressure, when taken near the freezing point, must allow sufficient time for complete thermal equilibrium to occur (i.e. approximately twenty to thirty minutes). The purer the liquid, the more sharply defined will the freezing point be. A point well up on the specific curve, such as points A and B of curves 140 and 142, respectively, at a loss such as twenty decibels, may be selected for calibrating a specific substandard against an absolute standard. The substandard may then afford a very high degree of precision in checking the pressure of a system as will be discussed in more detail in connection with Fig. 4.

In Fig. 3 a second specific illustrative arrangement for practicing particular principles of the invention is diagrammatically represented. In Fig. 3 a steel block 52 encloses an elongated cavity 54. At opposite ends of the cavity 54, input transducer 58 and output transducer 60, respectively, are mounted, being supported on a light steel bracket 63 as shown. Input transducer 58 is connected by leads 62 to the output of amplifier 72. The input of amplifier 72 is connected to the output of pulsing circuit 70. The output transducer 60 is connected by leads 64 to the input of pulse amplifier 66. The output of amplifier 66 is connected to pulsing circuit 70 and pulse rate meter 68 as shown. Assuming cavity 54 to be filled with a specific liquid capable while in the fluid state of transmitting acoustic wave energy, the operation of the circuit described above is as follows.

Pulsing circuit 70 can be a conventional electrical pulse generating circuit of the type which in the absence of any incoming pulse on leads 69 will generate pulses separated by relatively long interpulse intervals. Each pulse is amplified in amplifier 72 and causes transducer 58 to generate a corresponding pulse of acoustic wave energy. The acoustic pulse travels through liquid 50 to output transducer 60 where it is converted back to an electrical pulse, amplified in amplifier 66, and transmitted over leads 69 to pulsing circuit 70. Circuit 70 responds to a pulse on leads 69 by generating a new pulse immediately, rather than waiting through its normal long interval. The loop circuit thus constituted is, of course, of a generic type well known and widely used in depth and distance measuring systems and the like. The number of pulses per second circulating in the loop is a direct measure of the time required for a pulse to traverse the loop and can be registered by a conventional pulse rate indicator 68 of any of the several types well known and widely used in the art. Since the transmission time through the electrical portions of the loop circuit will remain substantially constant, the circuit will obviously provide an indication of the time required for the acoustic pulse to travel from transducer 58 to transducer 60, i.e. the circuit can, obviously, provide an indication of the velocity of the acoustic waves in the liquid 50.

Pressure from a pressure testing system is applied to liquid 50 in substantially the same way as described above in connection with Fig. 1, i.e. through a bellows 30 on plug 32, the bellows connecting by passage 36 to pipe 34 which in turn is connected to the pressure transmitting medium of the pressure system to be checked. A second threaded plug 51 serves to close the lower end of cavity 54.

The velocity of the acoustic waves through liquid 50 varies substantially directly with the pressure to which the liquid is being subjected, as illustrated by curve 150 of Fig. 7, assuming the liquid to be pure carbon tetrachloride. The temperature of the block 52 and enclosed liquid 50 can be accurately maintained at any chosen value within a large range of temperatures by a surrounding bath of oil 17, the temperature of which is controlled and accurately maintained by adjustable temperature controlling means 11 coupled with thermostat 9 (as described above for the corresponding arrangements illustrated in Fig. 1). Curve 152 of Fig. 7 illustrates the variation of velocity of the acoustic waves with pressure when the specific liquid filling cavity 54 is silicone oil. As is obvious from curves 150 and 152 of Fig. 7, the arrangement of Fig. 3 constitutes a very convenient gauge of high accuracy for indicating pressures within a very appreciable range of pressures.

It is obvious that if for a given temperature the pressure is raised to or beyond that at which the liquid 50 solidifies, transmission between transducers 58 and 60 will become negligible and the pulse rate indicator 68 will suddenly drop to zero. Thus the arrangement of Fig. 3 can provide indications approximating those afforded by that of Fig. 1, in addition to continuous indications over a range of pressures less than the pressure at which liquid 50 solidifies. In general, however, the design illustrated in Fig. 1 is to be preferred if precise measurements involving the exact pressure substantially at the freezing point of the liquid are to be made.

The liquid 50 can of course be so chosen that it will not solidify at the highest pressure to which it is likely to be subjected. The following table, by way of specific examples, gives the freezing point pressures for five liquids at a temperature of zero degrees centigrade.

| Material | Chemical Formula | Freezing Point Pressure, Pounds per square inch |
|---|---|---|
| Analin | $C_6H_5NH_2$ | 2,950 |
| Carbon Tetrachloride | $CCl_4$ | 9,500 |
| Phenyl Bromide | $C_6H_5Br$ | 27,900 |
| Chloroform | $CHCl_3$ | 58,700 |
| Mercury | $Hg$ | 118,000 |

Fig. 4 illustrates, diagrammatically, an overall pressure testing system equipped with a plurality of pressure substandards of the invention.

The system comprises a pumping apparatus 100, connected through a valve 101 which automatically closes when the back pressure exceeds the pressure of apparatus 100, a pressure chamber 102 in which the materials to be tested are placed, a pressure adjustment control cylinder 106 having piston 105 on threaded rod 103 equipped with a handwheel 104, and a pressure gauge 110 connected by gauge line 108 to chamber 102.

Also connected to gauge line 108 are three pressure substandards, or precision gauges, 112, 114, 116, which can all be of the general type described in detail above in connection with Fig. 1, but having different specific liquids in each, respectively. Alternatively, one or mroe of the precision gauges can be of the type described in detail above in connection with Fig. 3.

It is apparent that a straightforward application of the principles of the present invention makes possible a convenient and precise check of the pressure of the overall testing system at numerous pressures throughout the range of the system.

It is to be definitely understood that the above described arrangements are illustrative only and by no means exhaustively cover the numerous and varied arrangements which will readily occur to those skilled in the art within the spirit and scope of the principles of the invention.

What is claimed is:

1. A method of accurately determining a specific pressure which comprises adjusting the temperature of a liquid which solidifies at said specific pressure and a predetermined temperature to said temperature, transmitting acoustic wave energy through said liquid and detecting said transmitted acoustic wave energy, subjecting said liquid to a pressure lses than said specific pressure and gradually raising the pressure until the detected acoustic wave energy decreases suddenly.

2. A pressure indicating device comprising a small chamber filled with a liquid having a predetermined freezing pressure at a definite temperature, means for bringing said liquid to said temperature, means for transmitting acoustic wave energy through said liquid and detecting the transmited acoustic wave energy, means for subjecting said liquid to the pressure of a pressure system, and means responsive to a sudden large decrease in the amplitude of the detected acoustic wave energy for indicating that the pressure to which said liquid is being subjected has reached the predetermined freezing pressure.

References Cited in the file of this patent
UNITED STATES PATENTS 2,283,750    Mikelson _____ May 19, 1942
2,669,877    Dunlap et al. _____ Feb. 23, 1954

OTHER REFERENCES

National Bureau of Standards, Technical News Bulletin, July 1955, vol. 39, No. 7, pp. 89 and 90.